(12) United States Patent
DeWitt et al.

(10) Patent No.: US 6,761,336 B2
(45) Date of Patent: *Jul. 13, 2004

(54) AIRCRAFT TAILSTRIKE AVOIDANCE SYSTEM

(75) Inventors: Wendi M. DeWitt, Everett, WA (US); David P. Eggold, Everett, WA (US); Monte R. Evans, Everett, WA (US); Mithra M. K. V. Sankrithi, Federal Way, WA (US); Stephen L. Wells, Bothell, WA (US)

(73) Assignee: Boeing Company, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/043,401

(22) Filed: Jan. 8, 2002

(65) Prior Publication Data

US 2002/0066829 A1 Jun. 6, 2002

Related U.S. Application Data

(63) Continuation of application No. 09/520,329, filed on Mar. 7, 2000.
(60) Provisional application No. 60/168,783, filed on Dec. 2, 1999.

(51) Int. Cl.[7] .............................................. G05D 1/08
(52) U.S. Cl. ..................................... 244/181; 244/183
(58) Field of Search ................................ 244/183, 181, 244/179, 180, 221, 76 R, 75 R, 175, 187, 196; 701/15, 16

(56) References Cited

U.S. PATENT DOCUMENTS

| | | | |
|---|---|---|---|
| 3,945,590 A | | 3/1976 | Kennedy, Jr. et al. |
| 3,963,197 A | | 6/1976 | Oberlerchner |
| 3,979,717 A | * | 9/1976 | Barnum et al. .......... 244/17.13 |
| 4,495,483 A | * | 1/1985 | Bateman ..................... 340/970 |
| 4,528,564 A | * | 7/1985 | Trampnau ................... 340/946 |
| 4,695,013 A | * | 9/1987 | Trampnau ................... 244/187 |
| 4,763,266 A | | 8/1988 | Schultz et al. |
| 4,769,645 A | * | 9/1988 | Paterson ...................... 340/946 |
| 5,527,002 A | | 6/1996 | Bilange et al. |
| 5,823,479 A | * | 10/1998 | Nield et al. ................. 244/187 |
| 5,826,834 A | * | 10/1998 | Potter et al. ................ 244/181 |
| 5,901,927 A | * | 5/1999 | Ho .............................. 244/183 |
| 6,121,899 A | * | 9/2000 | Theriault .................... 340/946 |

FOREIGN PATENT DOCUMENTS

WO   WO 93/02405   2/1993

* cited by examiner

Primary Examiner—Peter M. Poon
Assistant Examiner—Timothy D. Collins
(74) Attorney, Agent, or Firm—Christensen O'Connor Johnson Kindness PLLC

(57) ABSTRACT

An aircraft flight control system is provided for reducing the likelihood of an aircraft tailstrike. The flight control system includes a pitch command provided to a pitch control device for altering the aircraft's pitch attitude. The improvement is a system of altering the pitch command to avoid an aircraft tailstrike. The improvement includes determining a current tailskid closure rate and a current tail height; comparing the current tailskid closure rate with a threshold closure rate to determine an excess closure rate amount; and adding an incremental nose-down pitch command with the pitch command to avoid a potential aircraft tailstrike. The threshold closure rate is dependent upon the current tailskid height. The incremental nose-down pitch command is calculated as a function of the excess closure rate amount. An alternative embodiment is provided in which the current height is compared with a threshold height (that is a function of the current tailskid closure rate) to determine an excess height amount. The excess height is then used to form an incremental nose-down pitch command. Another embodiment is described using both height and rate thresholds to calculate the incremental nose-down pitch command. Alternative arrangements may be used in which other non-derivative and derivative values are used, e.g., pitch angle margin and pitch rate.

20 Claims, 11 Drawing Sheets

AIRCRAFT TAILSTRIKE AVOIDANCE SYSTEM

CROSS-REFERENCES TO RELATED APPLICATIONS

This application is a continuation of U.S. patent application Ser. No. 09/520,329, filed Mar. 7, 2000, which claims the benefit of provisional Application No. 60/168,783, filed Dec. 2, 1999; the disclosures of both are hereby expressly incorporated by reference.

FIELD OF THE INVENTION

The present invention relates to aircraft flight control systems, and more particularly to commercial aircraft flight control systems that provide protection against inadvertent tail-to-ground contact.

BACKGROUND OF THE INVENTION

Aircraft can achieve high angles of incidence relative to a runway during both takeoff and landing segments of flight. If the angle becomes large enough while the aircraft is close to the ground, the aft or tail portion of the craft may contact the runway surface. Such contact is sometimes referred to as a tailstrike and is generally sought to be avoided. For this reason and others, manufacturers recommend pitch rates and speeds at which takeoff and landing maneuvers are to be performed. In practice, however, variations in both can be expected due to differing pilot techniques and weather conditions. In some instances, takeoff and landing speeds are increased to provide additional aft body margin and thus reduce the probability of tail contact in the event of a large variation in airspeed or pitch rate. Increasing scheduled takeoff or landing speeds is not an optimal arrangement, since it introduces a performance penalty.

Others have sought to prevent tailstrikes by regulating aircraft incidence (angle of attack) by modifying the aircraft's commanded rotation rate. See for example U.S. Pat. No. 5,527,002 in which a percentage of commanded rotation rate is used to avoid a tailstrike. In doing so, the '002 invention does not consider several key parameters that can affect the probability of aft body contact. It is the understanding of the inventors herein that the rate at which the aft body approaches the runway is a function of both the rotation rate of the aircraft and the movement of the center of rotation relative to the runway.

Only when the majority of the weight of the aircraft is on the gear and the aircraft is rotating only about the landing gear, is the motion of the aft body toward the runway almost purely a function of rotation rate. As the wing begins to generate lift and the aircraft begins to climb away from the runway, the motion of the aft body toward the runways becomes a function of the motion of the rotation rate of the aircraft and the motion of the center of rotation relative to the runway. During this period, the center of rotation moves from the landing gear to the center of gravity of the airplane. In addition to this movement, the center of gravity of the airplane begins to move away from the runway as it lifts off. It is during this segment of the rotation, just at or just after liftoff, that many takeoff tailstrikes can occur. By ignoring the motion of the center of rotation, inventions based on pitch and pitch rate alone limit the performance of the aircraft in some situations and provide only limited protection in others.

SUMMARY OF THE INVENTION

The present invention is an improvement to an aircraft flight control system that reduces the likelihood of aircraft tailstrikes by considering such characteristics as tailskid height and tailskid rate during takeoffs and landings. The flight control system includes a pitch command provided to a pitch control device for altering the aircraft's pitch attitude. The improvement is a system of altering the pitch command to avoid an aircraft tailstrike. The improvement includes determining a current tailskid closure rate and a current tail height; comparing the current tailskid closure rate with a threshold closure rate to determine an excess closure rate amount; and adding an incremental nose-down pitch command with the pitch command to avoid a potential aircraft tailstrike. The threshold closure rate is dependent upon the current tailskid height. The incremental nose-down pitch command is calculated as a function of the excess closure rate amount.

An alternative embodiment is provided in which the current height is compared with a threshold height (that is a function of the current tailskid closure rate) to determine an excess height amount. The excess height is then used to form an incremental nose-down pitch command. Yet another embodiment is described using both height and rate thresholds to calculate the incremental nose-down pitch command. Alternative arrangements may be used in which other non-derivative and derivative values are used, e.g., pitch angle margin and pitch rate.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is a system for preventing tailstrikes of aircraft during takeoff and landing maneuvers. The system accounts for the various rotations and movements of the rotation centers by considering both the height of the aircraft aft body relative to the runway and the rate at which the aft body is actually approaching the runway (i.e., the "tail closure rate"). If the tail closure rate or tail height exceeds an expected boundary, the excess closure rate or excess tail height is used to develop a nose-down pitch command which is then summed onto the normal control law pitch command to help bring the closure rate and tail height to an acceptable value. If the closure rate and tail height stay within the boundary, it is not necessary for the system to alter the pitch command. By looking directly at aft body height and closure rate, all factors contributing to tailstrikes are inherently captured. Further, by predicting when tailstrikes are probable and only intervening in those cases, the current invention does not interfere with normal piloting techniques.

Figure 1:
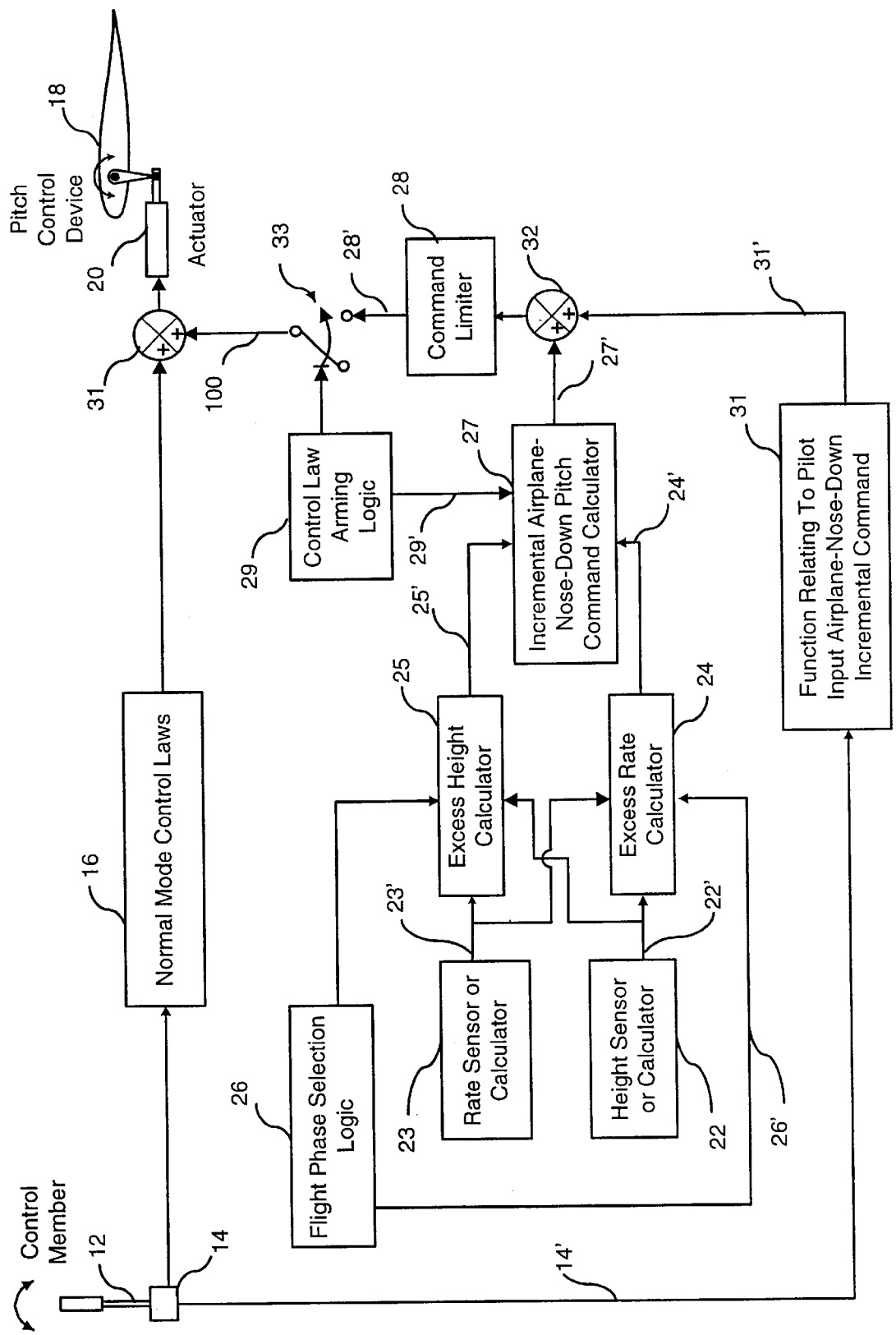
FIG. 1 is a schematic block diagram of an aircraft tailstrike avoidance system formed in accordance with the present invention.

FIG. 1 illustrates one embodiment of an aircraft tailstrike avoidance system formed in accordance with the present invention. Other arrangements are possible. A control member 12 is provided and is movable between pitch-up and pitch-down positions. The movement of the control member 12 is measured by sensor 14 that generates a corresponding output signal. The output signal is eventually used to control the positioning of an aerodynamic surface or other device capable of affecting the pitch angle and/or pitch rate of the aircraft (e.g., an elevator or stabilizer), generically referred to herein as a pitch control device 18. The pitch control device of FIG. 1 is mechanically positioned by an actuator 20 acting on input from a mechanical or electronic flight control system 16.

In accordance with the present invention, a height indicator 22 provides an output signal 22' indicative of the aircraft's tail height relative to the runway and a rate indicator 23 provides an output signal 23' indicative of the aircraft's tail closure rate relative to the runway. (The terms "tail height" and "tailskid height" are synonymous as used herein. The addition of the word "skid" refers to the approximate location on the tail from which tail height is taken. Similar terminology is used with regard to "tail rate" and "tailskid rate".) The indicators 22 and 23 may be implemented as sensors that directly measure this information, or they may be implemented as calculators that use various sensed measurements as the basis for calculating the height and closure rate. In one embodiment, tail height and closure rate are calculated using radio altimeter sensor data, inertial measurements from an onboard inertial reference unit, and airplane geometry. In another embodiment the tail height and closure rate are obtained using light or sound measurement techniques, such as laser range finders or sonar.

An excess rate calculator 24 computes the difference between the current tailskid rate 23' as supplied by the rate indicator 23 and an expected rate. The expected rate is a function of the current tail height 22' as supplied by the height indicator 22 and the current phase of flight as determined by the flight phase selection logic 26. In order to determine the aircraft phase of flight, throttle position, air-ground logic, and the position of the high lift system may be used by the flight phase selection logic unit 26 to determine whether the aircraft is performing a takeoff or landing. The difference between the current rate 23' and the expected rate is the excess rate 24', which is supplied to an incremental airplane-nose-down pitch command calculator 27.

An excess tail height signal 25' is calculated in a manner similar to the excess tail rate signal 24'. An excess height calculator 25 computes the difference between the current tailskid height 22' as supplied by the height indicator 22 and an expected height. The expected height is a function of the current tailskid rate 23' as supplied by the rate indicator 23 and the current phase of flight as determined by the flight phase selection logic 26. The difference between the current height and the expected height is the excess height 25', which is supplied to the incremental airplane-nose-down pitch command calculator 27. The incremental airplane-nose-down pitch command calculator 27 determines the units of pitch control required to avoid a possible tail contact and provides the information as an output signal 27'. In alternative embodiments, only one or the other of the excess height or excess closure rate is used to calculate the incremental command 27'.

The signal 27' is passed through a limiter 28 and outputted as a tail strike avoidance command 28'. A switch 33 is available to control whether the system is being used at a proper time and place. The switch 33 is controlled by a control law arming logic unit 29. The control law arming logic 29 considers the state of a variety of signals to determine if it is appropriate for the tailstrike protection control law to be active. These signals include indications that radar altimeter, pitch rate, ground speed, Mach number, vertical speed and pitch attitude are all valid. Additionally, Mach number, aircraft height, ground speed, truck tilt, gear position, in-air logic and pitch attitude are confirmed to be within acceptable limits. As above, depending on the particular circumstances, other logic may be used.

If the control law arming logic has determined that the tail strike avoidance command 28' entering the switch 33 has been formed from valid input signals and is being generated at an appropriate point in the flight envelope, the switch 33 allows the tail strike avoidance command 28' to be summed onto the pitch command from the normal control laws at a first combiner 30. Otherwise, the arming logic opens switch 33 to prohibit the use of the avoidance command 28'.

Still referring to FIG. 1, it may be advantageous in some implementations to include a calculating unit 31 to verify the instantaneous pilot input from the control member 12 and remove any portion of the incremental pitch command signal calculated at unit 22 that is equivalent to any nose-down input made by the pilot. The output signal 31' from the calculating unit 31 is summed into the output 27' from the incremental airplane-nose-down pitch command calculator 27 at a second combiner 32. Thus, if a pilot commands a nose-down pitch rate at the same time that an incremental nose-down pitch command signal is being generated, the calculating unit 31 ensures that the resulting nose down pitch rate will not be excessive.

The functionality of the present invention will become more evident through further description of each of the functions described above. Other embodiments and values are possible, depending on the particular circumstances.

Figure 2:
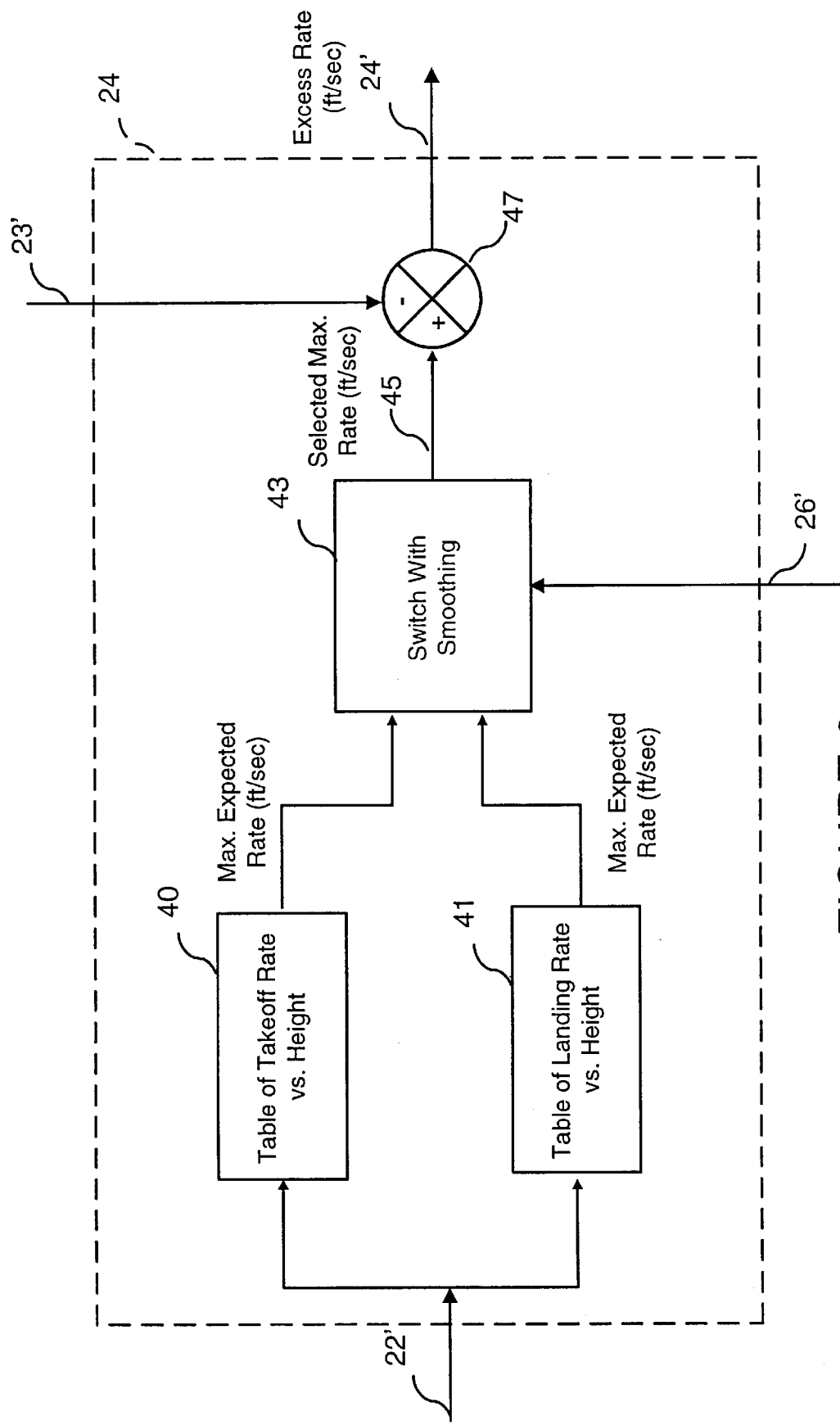
FIG. 2 is a control diagram of one embodiment of an excess tailskid closure rate calculator.

FIG. 2 shows the functionality of the excess rate calculator 24. The excess rate calculator contains two tables of maximum expected tailskid closure rate versus tailskid height. One table contains the maximum expected closure rate values (or rate boundaries) for takeoff maneuvers and another table contains the maximum expected closure rate values for landing maneuvers. The values in these tables are a poly-segmented curve; however, they may also consist of a continuous mathematical function that varies with tail closure rate, or a constant value.

The current maximum expected closure rate values outputted from these tables are determined by the current tailskid height signal 22' from unit 22. A switch 43 selects between passing the value outputted from one table to the other table based on the value of the flight phase flag 26', as the flight phase selection logic unit 26 changes state. The switch 43 additionally provides functionality that smoothes the transition from one table to the other when the flight phase flag 26' changes state. The current tailskid closure rate signal 23' is then subtracted from the selected expected tailskid closure rate boundary 45 by the combiner 47. The resulting signal is the excess tailskid closure rate 24', which is passed to the incremental airplane-nose-down pitch command calculator 27.

Figure 3:
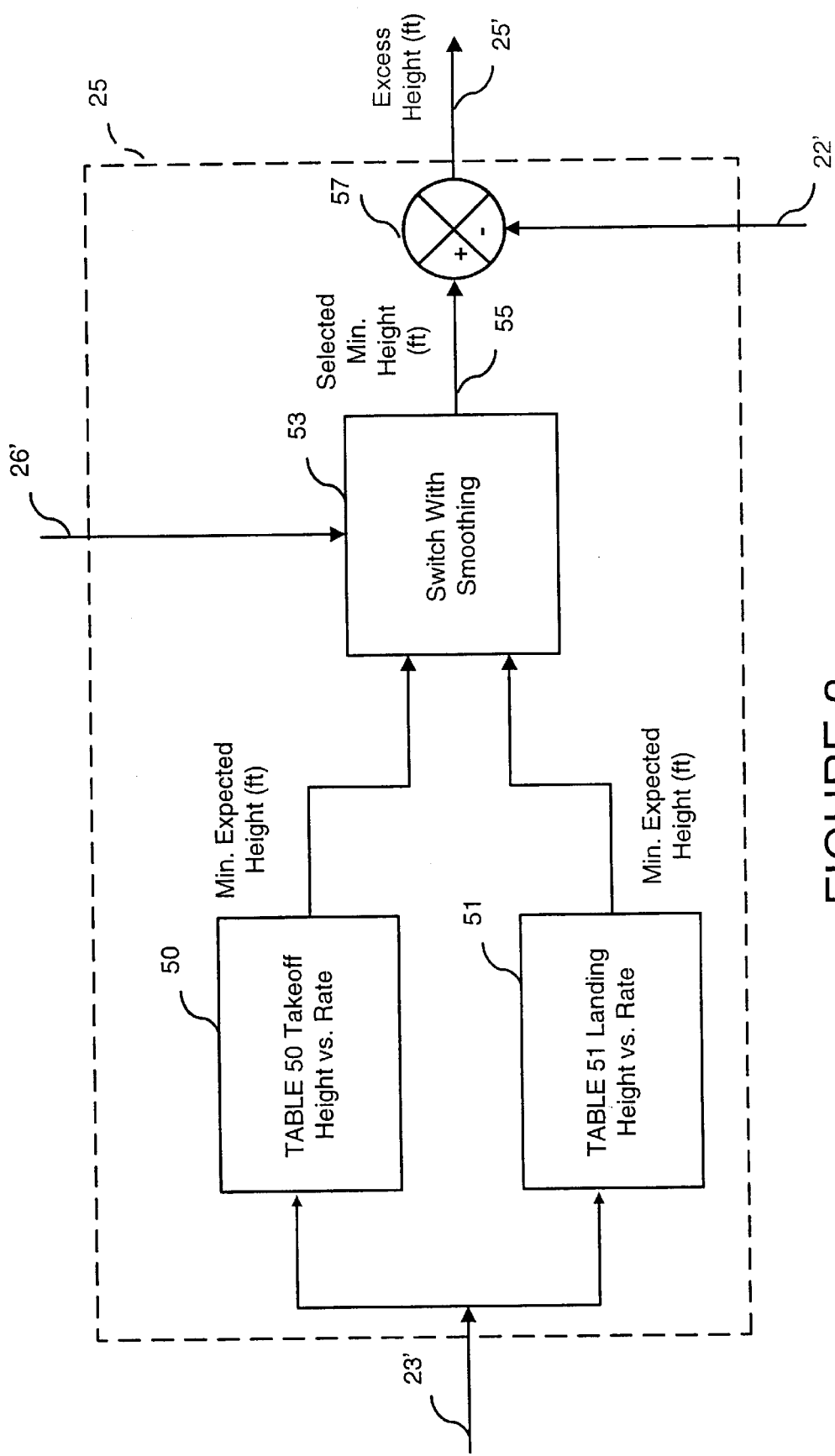
FIG. 3 is a control diagram of one embodiment of an excess tailskid height calculator.

FIG. 3 shows the functionality of the excess height calculator 25. The excess height calculator contains two tables of minimum expected tailskid height versus tail rate: one for minimum expected height values for takeoff maneuvers (height boundaries), and another for the minimum expected height values for landing maneuvers. The current minimum expected height values outputted from these tables are determined by the current tailskid rate signal 23' from unit 23. The values in these tables are constant values in the preferred embodiment; however, they also may consist of a continuous mathematical function that varies with tail closure rate or a poly-segmented curve.

A switch 53 selects between passing the value outputted from one table or the other based on the value of the flight phase flag. 26'. The switch 53 additionally provides functionality that smoothes the transition from one table to the other when the flag 26' changes state. The current tailskid height signal 22 is then subtracted from the selected expected tailskid height boundary 55 at a combiner 57. The resulting signal is the excess tailskid height 25', which is passed to the incremental airplane-nose-down pitch command calculator 27.

Figure 4:
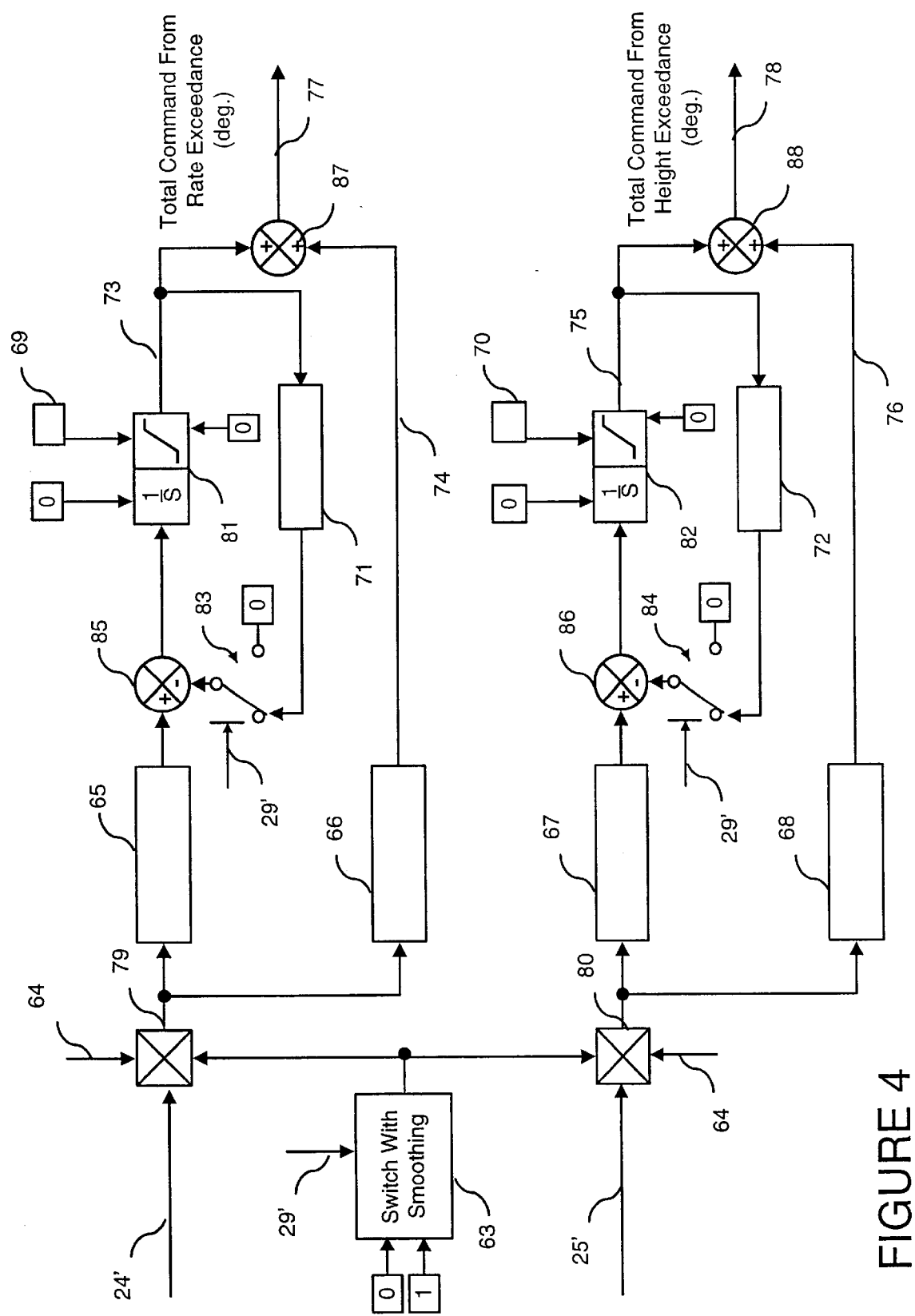
FIG. 4 is a control diagram of one embodiment of an incremental airplane-nose-down pitch calculator.

FIG. 4 shows one embodiment of portions of an incremental airplane-nose-down pitch command calculator 27. Excess tailskid rate 24' and excess tailskid height signals 25' are received from the excess closure rate calculator 24 and excess height calculator 25, respectively. Additionally, an arming discrete signal 29' is received from the control law arming logic unit (item 29 from FIG. 1). When the arming discrete 29' is true, a switch 63 smoothly ramps a gain onto the excess tailskid rate 24' and the excess tailskid height 25' from 0 to 1. These signals are then further multiplied by a gain that is a function of a dynamic pressure, shown in FIG. 4 as signal 64.

The resulting gained excess tailskid rate, signal 79, is then fed into an integral path (the upper path in FIG. 4) and a proportional path (the path therebelow). In the integral path, the gained excess tailskid rate signal 79 is multiplied by another gain 65 and fed into an integrator 81 which integrates the input signal as a function of time to produce a rate integral component signal 73. The integrator 81 is limited to be greater than 0 but less than an upper limit 69. The integrator 81 preferably includes a feedback loop that is activated by the arming discrete 29' at a switch 83 located prior to the integrator 81. If the arming discrete 29' is true, zero is subtracted from the input to the integrator at a combiner 85. If the arming discrete 29' is false, the rate integral component 73 is gained by a gain 71 and subtracted from the input to the integrator at the combiner 85, thus smoothly reducing any non-zero value remaining on the integrator to zero when the arming discrete 29' transitions from true to false.

In the proportional path, the gained excess tailskid rate signal 79 is multiplied by a gain 66 to produce the rate proportional component 74. The rate integral component 73 and the rate proportional component 74 are summed at a combiner 87 to produce the total command from rate exceedance, signal 77.

Still referring to FIG. 4, the resulting gained excess tailskid height, signal 80, is also preferably fed into an integral path and a proportional path. In the integral path, the gained excess tailskid height signal 80 is multiplied by another gain 67 and fed into an integrator 82 which integrates the input signal as a function of time to produce a height integral component signal 75. The integrator 82 is limited to be greater than 0 but less than an upper limit 70. The integrator 82 preferably includes a feedback loop that is activated by the arming discrete 29' at switch 84 located prior to the integrator 82. If the arming discrete 29' is true, zero is subtracted from the input to the integrator at a combiner 86. If the arming discrete 29' is false, the height integral component 75 is gained by a gain 72 and subtracted from the input to the integrator at the combiner 86, thus smoothly reducing any non-zero value remaining on the integrator to zero when the arming discrete 29' transitions from true to false.

In the proportional path, the gained excess tailskid height signal 80 is multiplied by a gain 68 to produce the height proportional component 76. The height integral component 75 and the height proportional component 76 are summed at a combiner 88 to produce the total command from height exceedance, signal 78.

Figure 5:
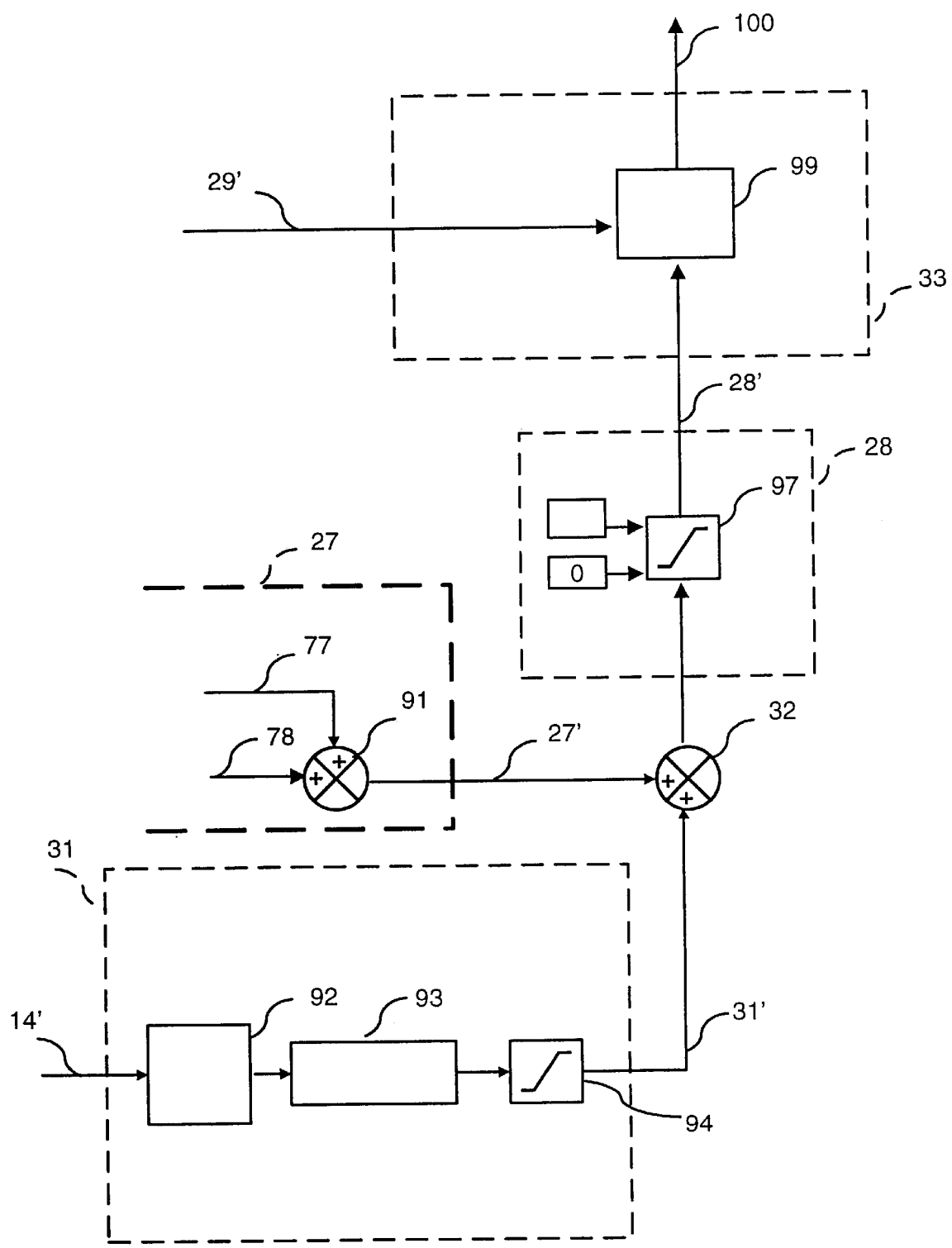
FIG. 5 is a control diagram of one embodiment of logic used to calculate and control the use of the tailstrike avoidance command.

The signals 77 and 78 are combined at a combiner 91, as shown in FIG. 5, to result in the incremental airplane-nose-down pitch command calculator output signal 27'. FIG. 5 further illustrates one embodiment of control logic used to determine how the total command from rate exceedance 77 and the total command from height exceedance 78 are combined with column canceling 31' to produce a final tail strike avoidance command 100.

As was previously mentioned, it may be advantageous in some implementations to include a function to verify the instantaneous pilot input from the control member 12 and remove any portion of the incremental pitch command signal 27' that is equivalent to any nose-down input made by the pilot. To accomplish this, a signal representative of the control column position 14' is passed through a filter 92 and gained by a gain 93. This signal is then passed through a limiter 94 to produce the column canceling command 31'.

The incremental pitch command signal 27' is added to the column canceling command 31' at the combiner 32. The resulting command is then limited by the limiter 28 and passed to the switch 33. The switch 33 is triggered by the arming discrete 29' issued from the control law arming logic unit 29 (see FIG. 1). Further, the switch 33 includes logic 99 to smoothly transition any signal coming from the limiter 28 to zero when the arming discrete 29' changes state from true to false. The signal emanating from this switch 33 is the total tailstrike avoidance command 100.

Figure 6:
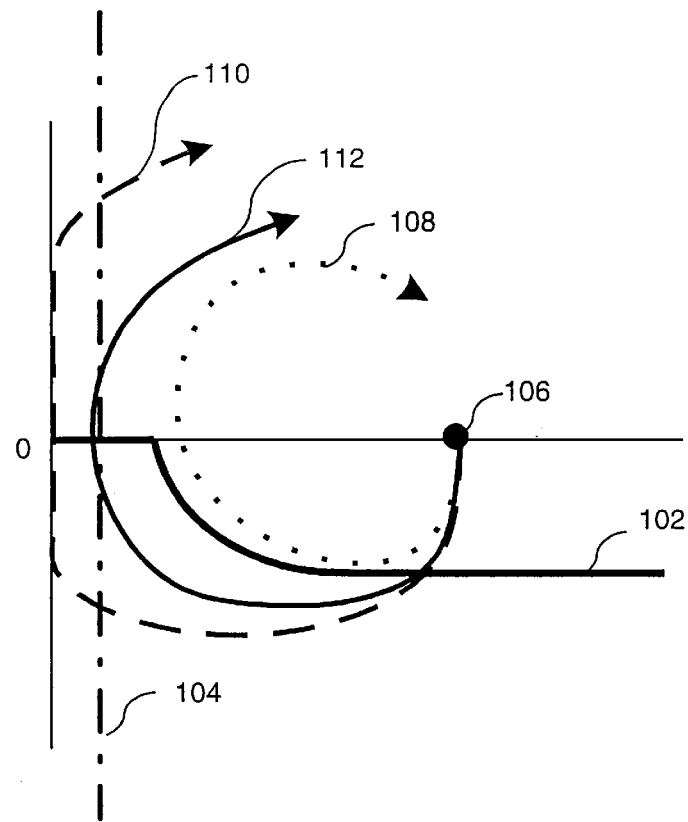
FIG. 6 is a diagram illustrating a plot of tail closure rate versus tail height for various flight circumstances during takeoff.

FIG. 6 illustrates the tail closure rate (vertical axis) versus tail height (horizontal axis) for one embodiment of the present invention during takeoff. Line 102 represents a plotting of maximum expected closure rate versus tail height provided by the table from unit 40 in FIG. 2. Line 104 represents a plotting of minimum expected tail height versus tail rate provided by the table from unit 50 in FIG. 3. Lines 102 and 104 are also referred to herein as threshold boundaries. In one preferred embodiment, the closer the tail height is to the runway, the lower the absolute value of expected closure rate becomes. The lines 102 and 104 may be determined by empirical data for the airplane for which they are intended. Different boundaries may be required for different airframes.

Starting at point 106, all aircraft wheels are on the runway and the aft body closure rate is zero. The height of the aft body relative to the runway is nearly constant as the plane accelerates down the runway. Upon initiating takeoff rotation, the aft body moves toward the runway and the tail height begins to decrease. Line 108 represents a normal takeoff profile in which the tail closure rate for tail height is within the threshold boundary of line 102 and above line 104 resulting in no input to the elevator by the present invention. When the plane begins to climb away from the runway, the closure rate changes sign and tail height begins to increase.

Line 110 represents an abusive takeoff profile without the benefit of the current invention. In this case, the rotation rate was high enough and the rate of climb after takeoff was low enough that the aft body of the aircraft touched the runway at the point where tail height goes to zero. Line 112 is illustrative of the same abusive takeoff were the present invention is used to prevent tailstrike. When the trajectory crosses the maximum allowable closure rate line 102, the present invention sums an incremental nose-down pitch command with the pilot-commanded pitch to favorably alter the position of the pitch control device by backing off of the pitch-up command. Further nose-down command is added after the trajectory crosses below the minimum expected height boundary 104. This slows the approach of the aft body toward the runway until the airplane can generate enough lift to climb away from the runway and avoid a tailstrike. As shown, after line 112 reaches the boundary 102, the change in rate of closure begins to lessen.

Figure 7:
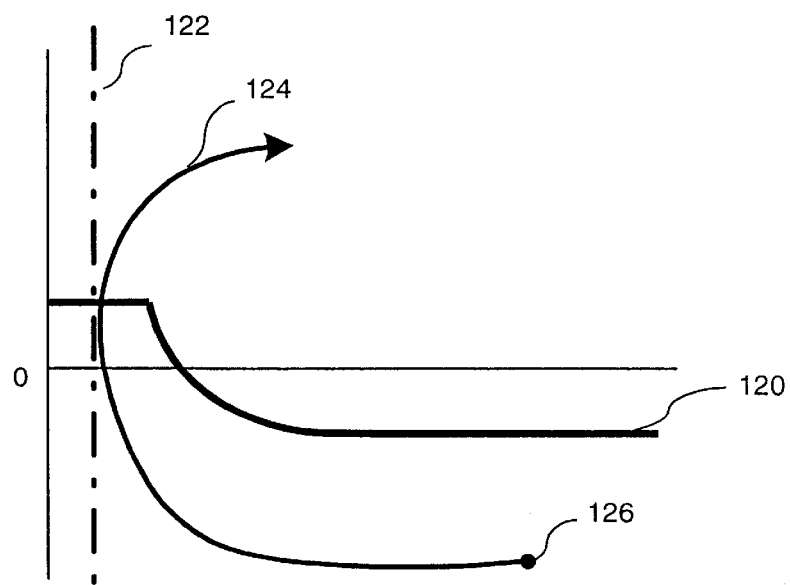
FIG. 7 is a diagram illustrating a plot of tail closure rate versus tail height for an example landing.

Referring to FIG. 7, the system response during landing is similar to takeoff. Line 120 represents one embodiment of a landing threshold boundary as contained in the table from unit 41 in FIG. 2. Line 122 represents a plotting of the minimum expected tail height versus tail rate provided by the table from unit 51 in FIG. 3. Line 124 represents an example plotting of tail height versus closure rate. When the aircraft touches down, the aft body closure rate may already be on the activation side of the maximum expected closure rate, as shown by example point 126. An incremental nose-down pitch command is smoothly added into the current pitch command to lessen the closure rate. The system preferably continues to apply an incremental command when the aft body is near the ground until the aft body is actually moving away from the runway. This encourages a de-rotation of the airplane just after touch down if the tail is very near the ground, thereby avoiding a tailstrike.

Figure 8:
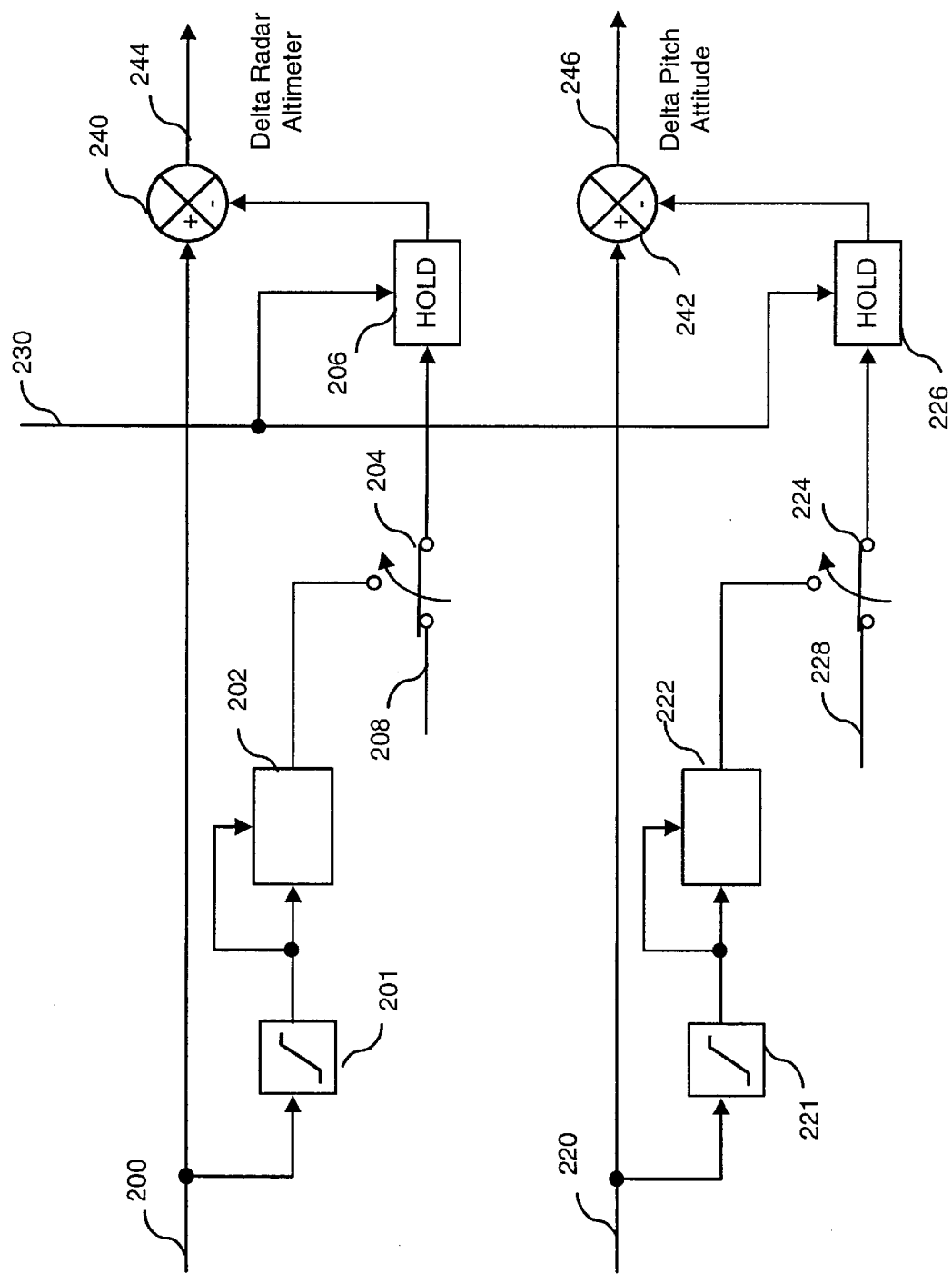
FIGS. 8, 9, 10, and 11 are control diagrams illustrating one embodiment of steps useful in calculating current tailskid height and tailskid rate.

FIGS. 8, 9, 10, and 11 are control diagrams illustrating one embodiment of steps useful in calculating current tailskid height 22' and tailskid rate 23'. In particular, FIG. 8 shows an initial step in calculating current tailskid height and tailskid rate to remove any biases in the radar altimeter signal and remove the slope of the runway from the pitch attitude. A radar altimeter signal 200 is passed through a limiter 201 and a lag filter 202. If the radar altimeter signal and a ground speed signal are valid and the airplane is not in air, the filter signal 202 is sent through a switch 204 to a value holding function 206. If the airplane has been in air sufficiently long or radar altimeter signal and ground speed signals are not valid, a default value of radar altimeter height 208 is sent through switch 204 instead. This default height 208 is representative of the actual height of the radar altimeter above the runway with the airplane parked on a level surface.

Similarly, a pitch attitude signal 220 is passed through a limiter 221 and a lag filter 222. If the pitch attitude signal and ground speed signal are valid and the airplane is not in air, the filter signal is sent through switch 224 to a value holding function 226. If the airplane has been in air sufficiently long or pitch attitude signal and ground speed signal are not valid, a default value of pitch attitude 228 is sent through switch 224. This default pitch attitude is representative of the actual pitch attitude of the airplane at a nominal weight and center of gravity with the airplane parked on a level surface.

Provided that the ground-speed signal is valid and the airplane is not in air, a signal 230 is sent to holding functions 206 and 226 when the ground speed exceeds a certain level, e.g., 60 knots. When the signal 230 is received by the holding functions 206 and 226, the current values that exist in the holding functions are saved and passed on to combiners 240 and 242 respectively. The output of the holding function 206 is removed from the radar altimeter signal 200 by combiner 240 to produce a delta radar altimeter signal 244. The output of the holding function 226 is removed from the pitch attitude signal 220 by combiner 242 to produce a delta pitch attitude signal 246.

Figure 9:
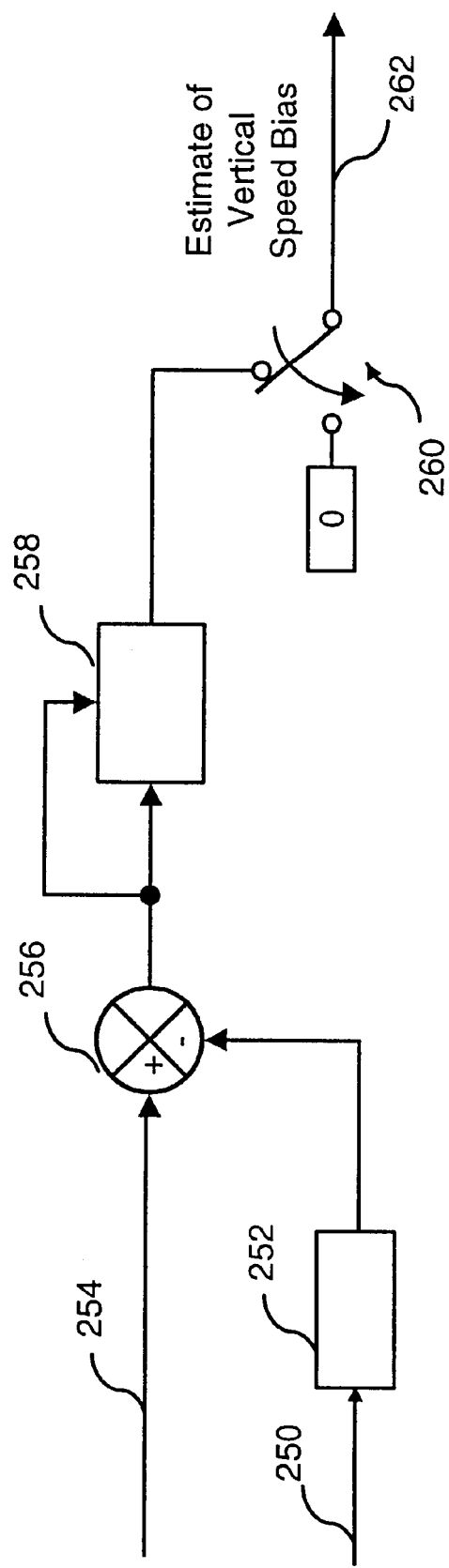

Referring to FIG. 9, it is noted that radar altimeters may experience brief periods of data dropout during takeoff roll due to nose-wheel spray resulting from rain, snow or slush on the runway. In that instance it is helpful to calculate a signal to be used as an initial condition value for integrators further downstream in the tailskid height calculation of unit 22. This initial condition signal is an estimate of the vertical speed of the aircraft while on the ground due to accelerating the aircraft on a sloped runway. To calculate this value, pitch rate 250 in radians per second is multiplied by a gain 252 representative of the distance from the main landing gear to the inertial reference unit on the aircraft to produce a signal representative of the vertical speed due to the pitching of the aircraft. This signal is subtracted from vertical speed 254 in feet per second at a combiner 256. The resulting signal is passed through a lag filter 258 to smooth high frequency responses. A switch 260 is provided to make sure that the output from the filter 258 is passed on only if the airplane in on the runway. If the airplane is airborne, a value of zero is passed through the switch 260. The output signal 262 received from switch 260 is an estimate of the vertical speed bias.

Figure 10:
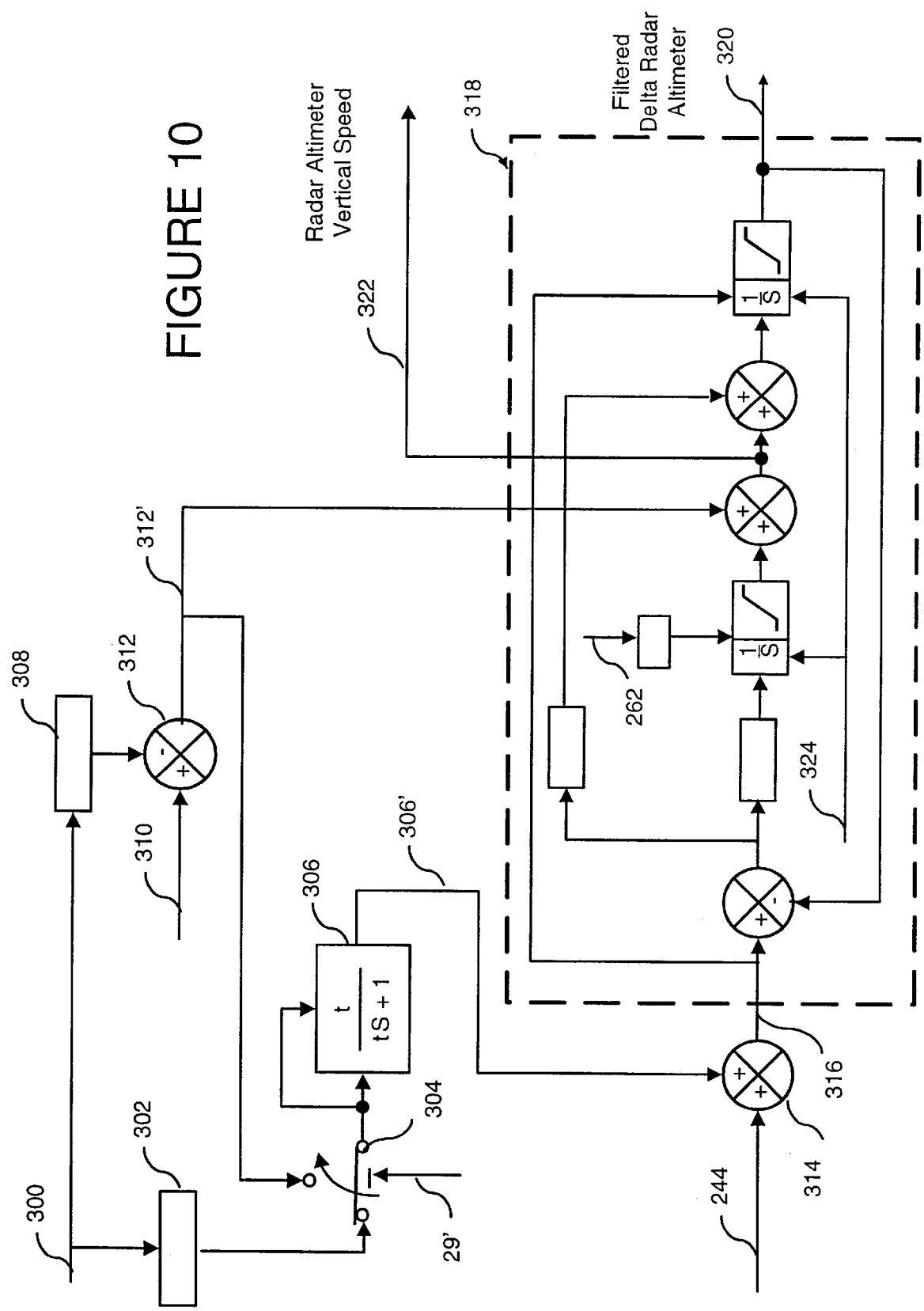

FIG. 10 illustrates one embodiment of the filtering of the radar altimeter signal and the determination of the radar altimeter vertical speed to account for signal time delay. It is noted that there may be a time delay on the signal from the radar altimeter to the primary flight computer on the airplane to which the current invention is applied. The time delay in other applications may differ. To account for a delay, corrections are employed such as those shown in FIG. 10. The corrections differ depending on whether the airplane is taking off or landing.

While the airplane in it takeoff mode, as determined by the flight phase logic signal 29', a pitch rate signal 300 in radians per second is multiplied by a gain 302 representing the length from the radar altimeter to the main landing gear. The resulting value is passed through a switch 304 to a lag filter 306. When the airplane is in landing mode as determined by the flight phase logic signal 29', the pitch rate signal 300 is also multiplied by a gain 308 representing the distance from the inertial reference unit to the radar altimeter (similar to gain 302). The resulting signal is subtracted from a vertical speed signal 310 in feet per second at a combiner 312 and passed through switch 304 to the lag filter 306. Note: Lag filter 306 has a tau in the numerator. The value of this tau is the same as the tau in the denominator, and is chosen to be equal to the time delay in seconds that exists in the radio altimeter signal between the radio altimeter and the primary flight computer. The signal emanating from the lag filter 306 is added to the delta radar altimeter signal 244

(from FIG. 8) at a combiner 314 to produce a delay compensated radar altimeter signal 316. This signal 316 is passed through a second order complementary filter 318 to produce a filtered delta radar altimeter signal 320 and a vertical speed signal 322 of the radar altimeter relative to the runway. The second order complementary filter 318 is triggered by a logic signal 324. This logic signal 324 ensures that the airplane is near the ground and that the inputs to the filter are valid. If the value of signal 324 is false, the filter 318 is supplied with an initial condition signal 262 that is an estimate of the vertical speed bias as calculated in FIG. 9.

Figure 11:
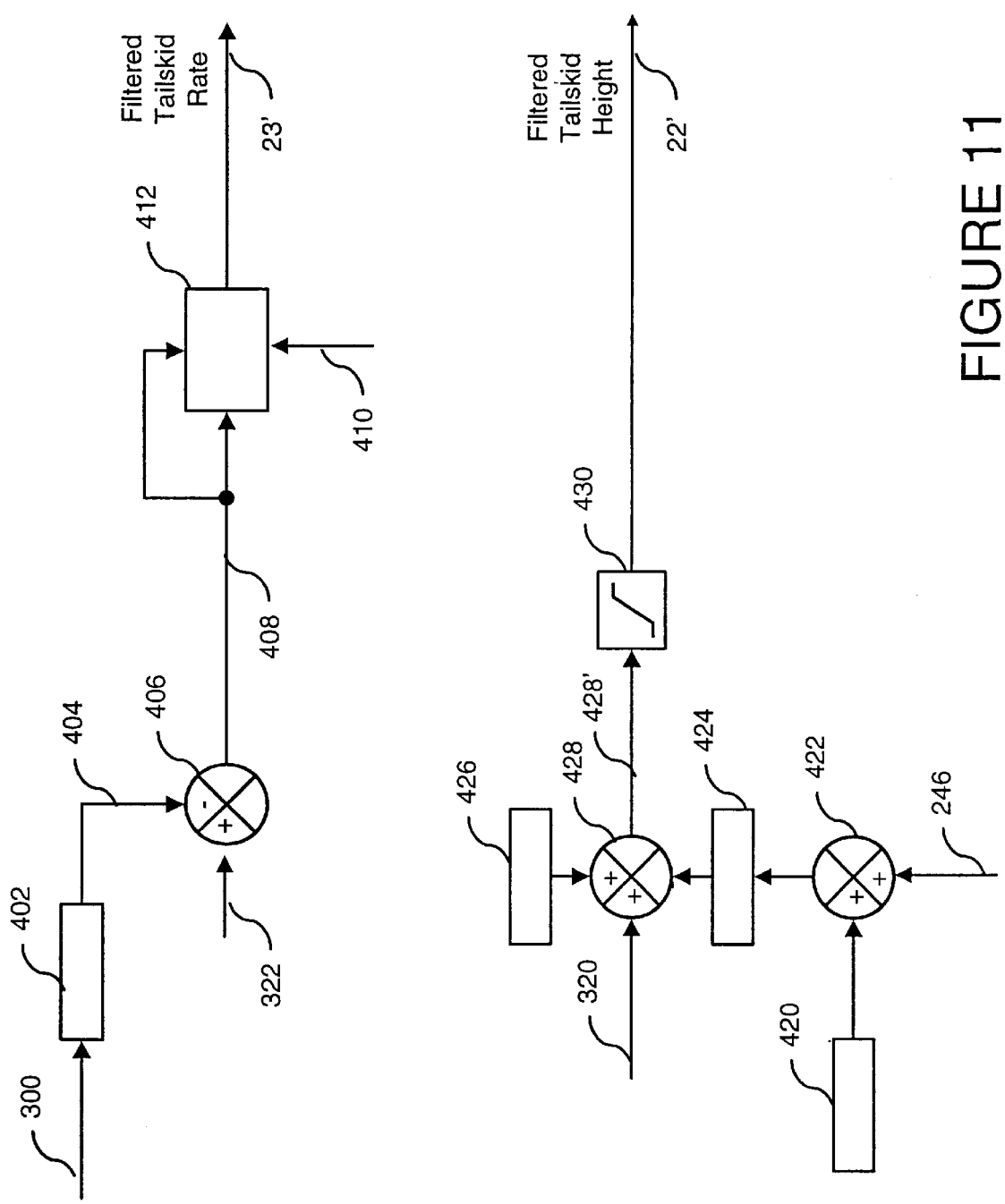

FIG. 11 shows the final calculation of the tailskid height signal 22' and the tailskid rate signal 23'. Pitch rate signal 300 is multiplied by a gain 402 representing the distance from the radar altimeter to the tailskid, resulting in a signal 404 representing the portion of the tailskid closure rate due to pitch rate. The signal 322 (see FIG. 10) representing the vertical speed of the radar altimeter relative to the runway is combined with the portion of the tailskid closure rate due to pitch rate signal 404 at a combiner 406 to produce a signal representative of the tailskid closure rate toward the runway 408. If the airplane is near the ground and the inputs are valid as determined by a logic signal 410, the signal 408 is lag filtered by a filter 412 to produce a smoothed tailskid rate 23'. This value is then passed to the rest of the control system shown in FIG. 1.

Still referring to FIG. 11. The delta pitch attitude signal 246 (see FIG. 8) is summed with a pitch attitude increment 420 at a combiner 422. The pitch attitude increment 420 represents the change in pitch attitude sensed by the pitch attitude sensor in the nose due to the bending of the fore body of the aircraft when the nose wheel is lifted off the runway during rotation and while in flight. The signal coming from combiner 422 is multiplied by a gain 424 representing the distance from the radar altimeter to the tailskid and summed with the filtered delta radar altimeter signal 320 and a constant 426 at a combiner 428. The constant 426 represents the nominal height of the tailskid above the runway while the airplane is parked. The signal 428' coming from the combiner 428 is prevented from exceeding predetermined values by limiter 430. The resulting signal is the tailskid height signal 22'. This value is then passed to the rest of the control system shown in FIG. 1.

Instead of using height versus closure rate, pitch angle margin versus pitch rate may be used. Here, pitch angle margin is defined as the difference between the current pitch angle and the pitch angle at which the aft body of the aircraft will contact the runway with the aircraft in its present position relative to the runway. In this regard, other non-derivative values may be used in combination with their time derivative value. For example, as described above, the non-derivative value of height is used with time rate of change of height, or closure rate. Likewise, pitch rate is a related time derivative value of pitch angle margin. Other non-derivative and derivative values may be used, either in combination or alone.

Figure 12:
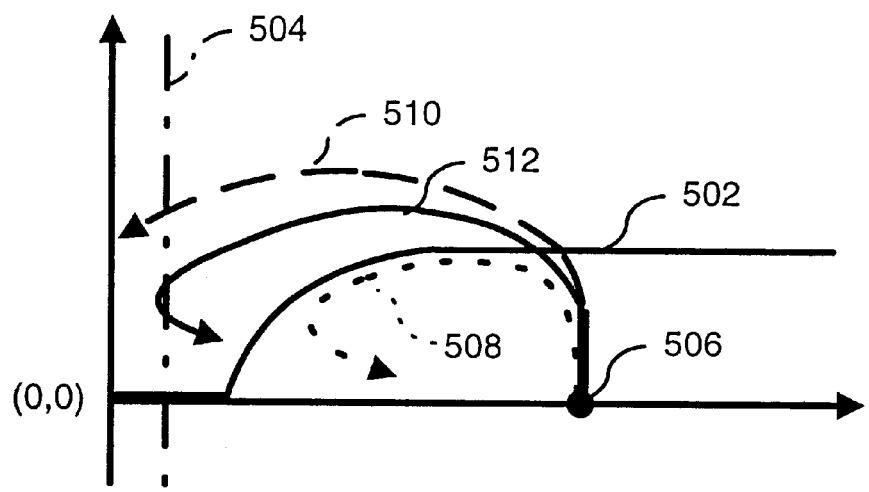
FIG. 12 is a diagram illustrating an alternative embodiment which plots pitch rate versus pitch angle margin for various flight circumstances during takeoff.

FIG. 12 illustrates pitch rate (vertical axis) versus pitch angle margin to tailstrike (horizontal axis) for another embodiment of the present invention during takeoff. Pitch rate may be measured in earth or body axis systems. Line 502 represents a plotting of maximum expected pitch rate versus pitch angle margin, similar to line 102 in FIG. 6. Line 504 represents a plotting of minimum expected pitch angle margin versus pitch rate similar to line 104 in FIG. 6. In this regard, tables, similar to Tables 40, 41, 50, and 51 are available for pitch angle margin and pitch rate. Lines 502 and 504 are also referred to herein as threshold boundaries.

In one embodiment, the smaller the pitch angle margin, the lower the absolute value of expected pitch rate becomes. The lines 502 and 504 may be determined by empirical data for the airplane for which they are intended. Different boundaries may be required for different airframes.

Starting at point 506, all aircraft wheels are on the runway and the pitch rate is zero. The pitch angle margin relative to the runway is nearly constant as the plane accelerates down the runway. Upon initiating takeoff rotation, the aft body moves toward the runway and the pitch angle margin begins to decrease. Line 508 represents a normal takeoff profile in which the pitch rate is within the threshold boundary of line 502 and at an acceptable value relative to line 504, resulting in no input to the elevator by the present invention. When the plane begins to climb away from the runway, the pitch angle margin begins to increase.

Line 510 represents an abusive takeoff profile without the benefit of the current invention. In this case, the rotation rate was high enough and the rate of climb after takeoff was low enough that the aft body of the aircraft touched the runway at the point where pitch angle margin goes to zero. Line 512 is illustrative of an abusive takeoff were the present invention is used to prevent tailstrike. When the trajectory crosses the maximum allowable pitch rate line 502, the present invention sums an incremental nose-down pitch command with the pilot-commanded pitch to favorably alter the position of the pitch control device by backing off of the pitch-up command. Further nose-down command is added after the trajectory crosses below the minimum expected pitch angle margin boundary 504. This slows the approach of the aft body toward the runway until the airplane can generate enough lift to climb away from the runway and avoid a tailstrike.

Figure 13:
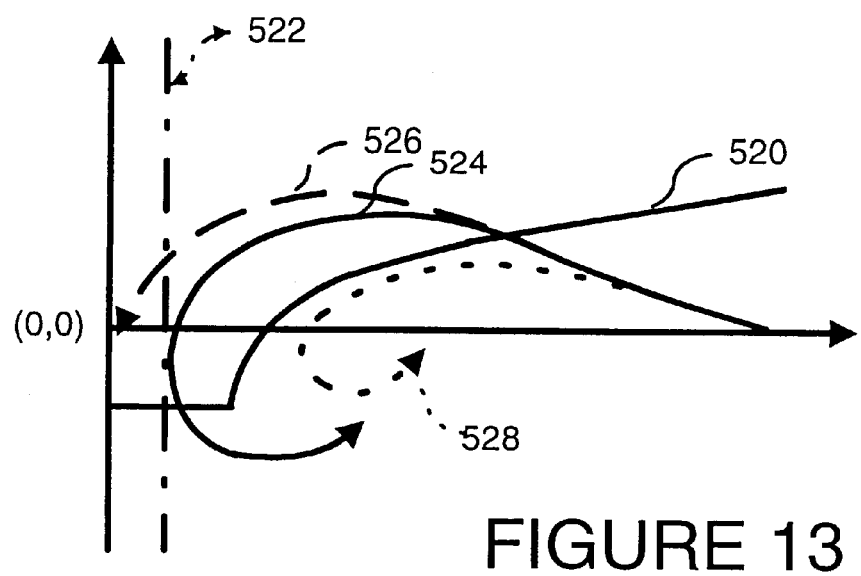
FIG. 13 is a diagram illustrating the embodiment shown in FIG. 12 for various flight circumstances during landing.

Referring to FIG. 13, the system response during landing is similar to takeoff scenario of FIG. 12. Line 520 represents one embodiment of a landing threshold boundary similar to line 120 in FIG. 7. Line 522 represents a plotting of the minimum expected pitch angle margin versus pitch rate, similar to line 122 in FIG. 7. Line 524 represents an example plotting of pitch angle margin versus pitch rate. For a normal landing, the pitch rate versus pitch angle margin on path 528 is normal, and the tailstrike protection function is inactive. In an alternative scenario, when the aircraft touches down, the pitch angle may already be on the activation side of the maximum expected pitch rate, as shown by lines 526 and 524. In the case of line 524, an incremental nose-down pitch command was smoothly added according to the present invention into the current pitch command to lessen the pitch rate. The system preferably continues to apply an incremental command when the aft body is near the ground until the aft body is actually moving away from the runway. This encourages a de-rotation of the airplane just after touch down if the tail is very near the ground, thereby avoiding a tailstrike. In the absence of the invention, a tailstrike may occur as in line 526.

As will be appreciated from a reading of the above, the present invention uses the current aircraft tail height and closure rate during takeoff and landing to determine whether pitch attitude intervention is necessary to avoid a tailstrike. By using real-time measurements of height and closure rate, the present invention inherently accounts for the various rotations and movements of the rotation centers. If the tail closure rate exceeds an expected boundary, the excess closure rate is used to develop a nose-down pitch attitude command to help bring the closure rate and height to an acceptable value. By predicting when tailstrikes are probable and only intervening in those cases, the current invention does not interfere with normal piloting techniques unless it is absolutely necessary. In addition, even if the normal pitch command is zero, the present invention will still operate to avoid a tailstrike if need be.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In an aircraft flight control system having a normal pitch command signal provided to a pitch control device for altering the aircraft's pitch attitude, an improvement for reducing the likelihood of an aircraft tailstrike, the improvement comprising:
   (a) determining a current tailskid height and a current tailskid closure rate wherein the current tailskid closure rate is determined at least in part by vertical speed of at least a part of the aircraft;
   (b) comparing the current tailskid closure rate with a threshold closure rate to determine an excess closure rate amount, the threshold closure rate being dependent upon the current tailskid height; and
   (c) adding an incremental nose-down pitch command signal to the normal pitch command signal to avoid a potential aircraft tailstrike, the incremental nose-down pitch command signal being calculated as a function of the excess closure rate amount.

2. In an aircraft flight control system having a normal pitch command signal provided to a pitch control device for altering the aircraft's pitch attitude, an improvement for reducing the likelihood of an aircraft tailstrike, the improvement comprising:
   (a) determining a current tailskid height and a current tailskid closure rate wherein the current tailskid closure rate is determined at least in part by vertical speed of at least a part of the aircraft;
   (b) comparing the current tailskid height with a threshold height to determine an excess height amount, the threshold height being dependent upon the current tailskid closure rate; and
   (c) adding an incremental nose-down pitch command signal to the normal pitch command signal to avoid a potential aircraft tailstrike, the incremental nose-down pitch command signal being calculated as a function of the excess height amount.

3. The improvement according to claim 2, further comprising comparing the current closure rate with a threshold closure rate to determine an excess rate amount; the threshold closure rate being dependent upon the current tailskid height; the incremental nose-down pitch command being calculated as the sum of a function of the excess height amount and a function of the excess rate amount.

4. The improvement according to claim 1 or 3, wherein determining the current tailskid closure rate and the current tailskid height includes using at least one sensor to directly measure these values.

5. The improvement according to claim 1, wherein determining the current tailskid closure rate and tailskid height includes calculating these values based on a plurality of sensor measurements.

6. The improvement according to claim 5, wherein the plurality of sensor measurements includes at least one of a radio altimeter measurement, an air data measurement, a radar sensor measurement, an inertial reference unit measurement, a laser range finder measurement, a sonar measurement, a wheel speed measurement, a landing gear oleo extension measurement, a landing gear load measurement, a landing gear truck tilt measurement, a physical tailskid compression measurement, and a physical tailskid load measurement.

7. The improvement according to claim 1, wherein comparing the current tailskid closure rate to the threshold closure rate includes accessing a lookup table to determine the threshold closure rate, the threshold closure rate having been predetermined as a function of tailskid height.

8. The improvement according to claim 2, wherein comparing the current tailskid height to the threshold height includes accessing a lookup table to determine the threshold height, the threshold height having been predetermined as a function of tailskid closure rate.

9. The improvement according to claim 1, wherein comparing the current tailskid closure rate to the threshold closure rate includes calculating their difference, the incremental nose-down pitch command being a proportion of the difference.

10. The improvement according to claim 2, wherein comparing the current tailskid height to the threshold height includes calculating their difference, the incremental nose-down pitch command being a proportion of the difference.

11. The improvement according to claim 1, wherein comparing the current tailskid closure rate to the threshold closure rate includes calculating their difference, the incremental nose-down pitch command being a time integral of the difference.

12. The improvement according to claim 2, wherein comparing the current tailskid height to the threshold height includes calculating their difference, the incremental nose-down pitch command being a time integral of the difference.

13. The improvement according to claim 1, wherein the threshold closure rate includes a take-off threshold closure rate and a landing threshold closure rate, the applicable threshold closure rate being selected on the basis of the aircraft's flap configuration.

14. The improvement according to claim 2, wherein the threshold height includes a take-off threshold height and a landing threshold height, the applicable threshold height being selected on the basis of the aircraft's current flap configuration.

15. The improvement according to claim 1 or 2, wherein the flight control system is an electronic flight control system; the normal pitch command and the incremental nose-down pitch command being digital electronic signals.

16. The improvement according to claim 1 or 2, further comprising applying the incremental pitch command during takeoff for a time after liftoff of about 30 seconds, while the aircraft is below a threshold altitude of about 100 feet, and while the aircraft is below a threshold airspeed of about Mach 0.5.

17. The improvement according to claim 16, wherein once passed any of the time, altitude, airspeed, and thresholds the incremental command is gradually eliminated.

18. The improvement according to claim 1 or 2, wherein the incremental nose-down pitch command includes one of an incremental nose-down elevator command and an incremental nose-down stabilizer command.

19. The improvement according to claim 1 or 2, further comprising allowing the ability to override the incremental nose-down pitch command by application of sufficient force and displacement to the pitch controller.

20. The improvement according to claim 1 or 2, further comprising a eliminating any portion of the incremental nose-down pitch command that is equivalent to an instantaneous nose-down pitch command from the pilot.

* * * * *

UNITED STATES PATENT AND TRADEMARK OFFICE
CERTIFICATE OF CORRECTION

PATENT NO. : 6,761,336 B2
DATED : July 13, 2004
INVENTOR(S) : W.M. DeWitt et al.

It is certified that error appears in the above-identified patent and that said Letters Patent is hereby corrected as shown below:

<u>Column 11,</u>
Lines 17 and 35, "rate wherein" should read -- rate, wherein --.

Signed and Sealed this

Second Day of May, 2006

JON W. DUDAS
*Director of the United States Patent and Trademark Office*